United States Patent
Aldana et al.

(10) Patent No.: US 10,716,024 B2
(45) Date of Patent: Jul. 14, 2020

(54) METHODS AND SYSTEMS FOR RANGING PROTOCOL

(71) Applicant: QUALCOMM Incorporated, San Diego, CA (US)

(72) Inventors: Carlos Aldana, Mountain View, CA (US); Xiaoxin Zhang, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 14/826,010

(22) Filed: Aug. 13, 2015

(65) Prior Publication Data
US 2016/0080960 A1    Mar. 17, 2016

Related U.S. Application Data

(60) Provisional application No. 62/049,882, filed on Sep. 12, 2014.

(51) Int. Cl.
| | |
|---|---|
| *H04W 24/10* | (2009.01) |
| *H04W 64/00* | (2009.01) |
| *G01S 5/14* | (2006.01) |
| *H04L 12/26* | (2006.01) |
| *G01S 13/78* | (2006.01) |
| *H04W 84/12* | (2009.01) |
| *G01S 13/74* | (2006.01) |

(52) U.S. Cl.
CPC .............. *H04W 24/10* (2013.01); *G01S 5/14* (2013.01); *H04L 43/0858* (2013.01); *H04L 43/106* (2013.01); *H04W 64/00* (2013.01); *G01S 13/74* (2013.01); *G01S 13/787* (2013.01); *H04W 84/12* (2013.01)

(58) Field of Classification Search
CPC ..... H04L 47/283; H04L 1/1621; H04W 24/00
See application file for complete search history.

(56) References Cited

U.S. PATENT DOCUMENTS

| | | | |
|---|---|---|---|
| 9,237,546 B1* | 1/2016 | Zhang | H04W 4/02 |
| 2013/0286959 A1* | 10/2013 | Lou | H04W 72/04 370/338 |
| 2014/0051460 A1 | 2/2014 | Dua et al. | |
| 2014/0073352 A1 | 3/2014 | Aldana et al. | |
| 2014/0154996 A1 | 6/2014 | Banin et al. | |
| 2014/0160959 A1 | 6/2014 | Aldana et al. | |

(Continued)

OTHER PUBLICATIONS

IEEE P802.11-REVmc/D3.0, Jun. 2014 Draft Standard for Information technology—Telecommunications and information exchange between systems Local and metropolitan area networks—Specific requirements. Part 11: Wireless LAN Medium Access Control (MAC) and Physical (Year: 2014).*

(Continued)

*Primary Examiner* — Jeffrey M Rutkowski
*Assistant Examiner* — Chae S Lee
(74) *Attorney, Agent, or Firm* — Hunter Clark PLLC

(57) ABSTRACT

Disclosed are systems, methods and devices for measuring a range between wireless devices using an exchange of messages between devices. For example, wireless transceiver devices may exchange messages transmitted in a wireless communications link to measure a time of flight. Based, at least in part, on the measured time of flight, a location of one of the wireless transceiver devices may be estimated.

7 Claims, 8 Drawing Sheets

(56) References Cited

U.S. PATENT DOCUMENTS

| | | | |
|---|---|---|---|
| 2014/0295877 A1 | 10/2014 | Hart | |
| 2015/0009953 A1 | 1/2015 | Park et al. | |
| 2015/0092697 A1* | 4/2015 | Yeow | H04L 1/0025 370/329 |
| 2015/0094103 A1* | 4/2015 | Wang | H04W 4/023 455/456.6 |
| 2015/0099538 A1* | 4/2015 | Wang | G01S 5/00 455/456.1 |
| 2015/0264530 A1* | 9/2015 | Prechner | H04W 4/025 455/456.2 |
| 2015/0373665 A1* | 12/2015 | Hart | H04W 64/00 455/456.1 |
| 2016/0021560 A1* | 1/2016 | Reshef | H04W 24/10 370/338 |
| 2016/0044524 A1* | 2/2016 | Ben-Haim | G01S 5/14 370/252 |
| 2016/0149671 A1 | 5/2016 | Yang et al. | |

OTHER PUBLICATIONS

Aldana C., et al., "802.11-2012 CID_46_47_48; 11-12-1249-04-000m-802-11-2012-cid-46-47-48", Qualcomm, IEEE SA Mentor; 11-12-1249-04-000M-802-11-2012-CID-46-47-48, IEEE-SA Mentor, Piscataway, NJ USA, vol. 802.11m, No. 4, Jan. 17, 2013 (Jan. 17, 2013), pp. 1-17, XP068040038.

International Search Report and Written Opinion—PCT/US2015/049526—ISA/EPO—dated Nov. 30, 2015.

Kakani N., et al., "Resolution for Draft 1.0 LB CID's CIDs 1424. 1671. 1418 ; 11-13-1178-00-000m-resolution-for-draft-1-0-lb-cid-s-cids-1424-1671-1418", IEEE Draft; 11-13-1178-00-000M-Resolution-For-Draft-1-0-LB-CID-S-CIDS-1424-1671-1418, IEEE-SA Mentor, Piscataway, NJ USA, vol. 802. 11m, Sep. 17, 2013 (Sep. 17, 2013), pp. 1-4, XP068063108. [retrieved on Sep. 17, 2013 ] the whole document.

* cited by examiner

METHODS AND SYSTEMS FOR RANGING PROTOCOL

CROSS REFERENCE TO RELATED APPLICATIONS

This application claims the benefit of U.S. Provisional Application No. 62/049,882, entitled "Methods and Systems for Ranging Protocol," filed Sep. 12, 2014, which is assigned to the assignee hereof and which is expressly incorporated herein by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the first message.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
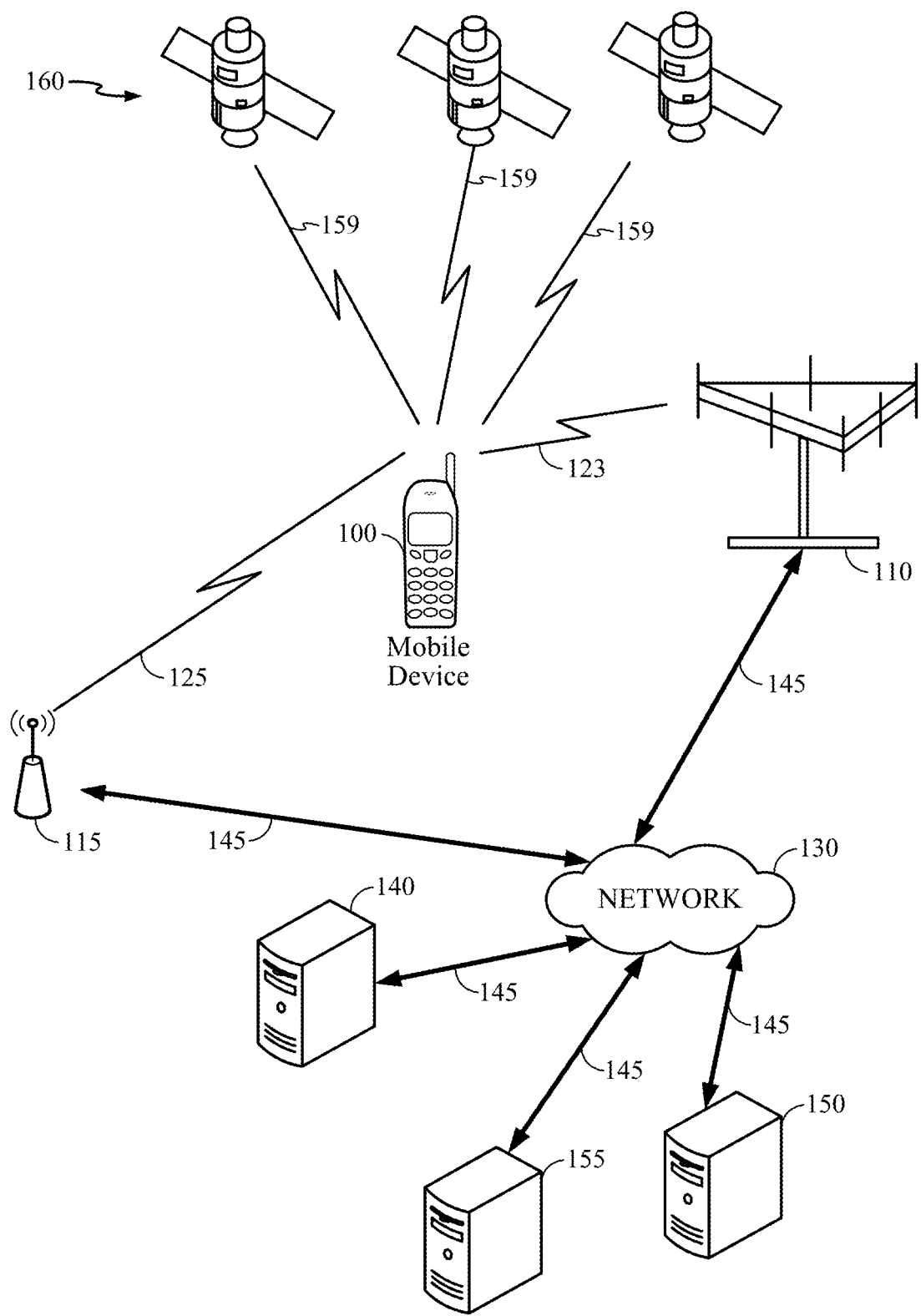
FIG. 1 is a system diagram illustrating certain features of a system containing a mobile device, in accordance with an implementation.

Briefly, particular implementations are directed to a method comprising, at a first wireless transceiver device, a method comprising: receiving a plurality of fine timing measurement (FTM) messages from a second wireless transceiver device, the plurality of FTM messages having been transmitted by the second wireless transceiver device in response to receipt, at the second wireless transceiver device, of an FTM request message, at least one of the plurality of FTM messages comprising a time stamp indicating a transmission time of a previously transmitted FTM message; and computing a time of flight based, at least in part, on the time stamp and a time of receipt of said previously transmitted FTM message.

Another particular implementation is directed to a method, at a first wireless transceiver device, comprising: receiving a fine timing measurement (FTM) request message from a second wireless transceiver device; and transmitting a plurality of FTM messages, at least one of the plurality of FTM messages comprising a time stamp indicating a transmission time of a previously transmitted FTM message.

Another particular implementation is directed to a first wireless transceiver device, comprising: a transceiver to transmit message to and receive messages from a wireless communication network; and one or more processors to configured to: obtain a plurality of fine timing measurement (FTM) messages at the transceiver from a second wireless transceiver device, the plurality of FTM messages being transmitted by the second wireless transceiver device in response to receipt, at the second wireless transceiver device, of an FTM request message, at least one of the plurality of FTM messages comprising a time stamp indicating a transmission time of a previously transmitted FTM message; and compute a time of flight based, at least in part, on the time stamp and a time of receipt of the previously transmitted FTM message.

Another particular implementation is directed to a first wireless transceiver device comprising: a transceiver; and one or more processors configured to: obtain a fine timing measurement (FTM) request message received at the transceiver and transmitted from a second wireless transceiver device; and initiate transmission of a plurality of FTM messages through the transceiver, at least one of the plurality of FTM messages comprising a time stamp indicating a transmission time of a previously received FTM message, in response to the FTM request message.

Another particular implementation is directed to a first wireless transceiver device comprising: means for receiving a plurality of fine timing measurement (FTM) messages from a second wireless transceiver device, the plurality of FTM messages having been transmitted by the second wireless transceiver device in response to receipt, at the second wireless transceiver device, of an FTM request message, at least one of the plurality of FTM messages comprising a time stamp indicating a transmission time of a previously transmitted FTM message; and means for computing a time of flight based, at least in part, on the time stamp and a time of receipt of the previously transmitted FTM message.

Another particular implementation is directed to a first wireless transceiver device comprising: means for receiving a fine timing measurement (FTM) request message from a second wireless transceiver device; and means for transmitting a plurality of FTM messages, at least one of the plurality of FTM messages comprising a time stamp indicating a transmission time of a previously transmitted FTM message.

Another particular implementation is directed to a storage medium comprising computer readable instructions stored thereon which are executable by a processor of a first wireless transceiver device to: obtain a plurality of fine timing measurement (FTM) messages received from a second wireless transceiver device, the plurality of FTM messages having been transmitted by the second wireless transceiver device in response to receipt, at the second wireless transceiver device, of an FTM request message, at least one of the plurality of FTM messages comprising a time stamp indicating a transmission time of a previously transmitted FTM message; and compute a time of flight based, at least in part, on the time stamp and a time of receipt of the previously transmitted FTM message.

Another particular implementation is directed to a storage medium comprising computer readable instructions stored thereon which are executable by a processor of a first wireless transceiver to: obtain a fine timing measurement (FTM) request message received from a second wireless transceiver device; and initiate transmission of a plurality of FTM messages, at least one of the plurality of FTM messages comprising a time stamp indicating a transmission time of a previously transmitted FTM message.

It should be understood that the aforementioned implementations are merely example implementations, and that claimed subject matter is not necessarily limited to any particular aspect of these example implementations.

DETAILED DESCRIPTION

As discussed below, particular message flows may enable effective and efficient measurements of a round trip time (RTT) in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point, personal area network (PAN) or femto cell). Particular message flows and fields in message frames may enable obtaining RTT measurements with sufficient accuracy for measuring a range between the wireless STAs using fewer messages, for example. Such a measured range may be used in any one of several applications including positioning operations, for example.

As discussed below, a first STA may transmit a fine timing measurement request message to a second STA to initiate a process for an exchange of messages or frames enabling the first STA to obtain an RTT measurement. In a particular implementation, the fine timing measurement request message may include an indication as to whether the first STA is capable of sharing ranging measurements or other parameters indicative of range. In a particular implementation, subsequent to computation of an RTT measurement, the first STA may transmit one or more messages to the second STA comprising a computed range or RTT measurement or other parameter indicative of range. It should be understood that this is merely an example implementation and that claimed subject matter is not limited in this respect.

Transmissions of messages between STAs for the measurement of RTT typically occurs in addition to other message traffic supporting other applications such as voice, video, HTTP, data, just to provide a few examples. Accordingly, in dense operating environments, messaging between STAs for the measurement of RTT may increase congestion and contention for wireless link resources. In particular implementations discussed below, particular positioning techniques may be supported by measuring a time of flight (TOF) for the transmission of a message between STAs using fewer messages than typical techniques used for measuring RTT.

In certain implementations, as shown in FIG. 1, a mobile device 100 may receive or acquire satellite positioning system (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, mobile device 100 may transmit radio signals to, and receive radio signals from, a wireless communication network. In one example, mobile device 100 may communicate with a cellular communication network by transmitting wireless signals to, or receiving wireless signals from, base station transceiver 110 over wireless communication link 123. Similarly, mobile device 100 may transmit wireless signals to, or receive wireless signals from local transceiver 115 over wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between mobile device 100 and servers 140, 150 or 155 through local transceiver 115 or base station transceiver 110. In another implementation, network 130 may comprise cellular communication network infrastructure such as, for example, a base station controller or master switching center (not shown) to facilitate mobile cellular communication with mobile device 100.

In a particular implementation, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, mobile device 100 may obtain an indoor position fix by applying characteristics of acquired signals to a radio heatmap indicating expected angle of arrival (AoA). In other alternative implementations, as pointed out above, mobile device 100 may obtain an indoor position fix by applying characteristics of acquired signals to a radio heatmap indicating expected TOF. Accordingly, a radio heatmap may comprising TOF, AoA, RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected AoA, TOF, RSSI or RTT. It should be understood, however, that these are merely examples of values that may be stored in a radio heatmap, and that claimed subject matter is not limited in this respect.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured AoA, TOF, RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver, between two peer mobile devices, or between two stationary transceivers, just to provide a few examples. In particular implementations, various techniques described herein may incorporate some, but not necessarily all, aspects or features of IEEE Standard 802.11 for Information technology—Telecommunications and information exchange between systems, Local and metropolitan area networks—Specific requirements Part 11: Wireless LAN Medium Access Control (MAC) and Physical Layer (PHY), Feb. 6, 2012, section 10.23.5 (hereinafter "IEEE std. 802.11"). Indeed, it should be understood that some features discussed herein are not shown, described or taught in the IEEE std. 802.11.

Figure 2:
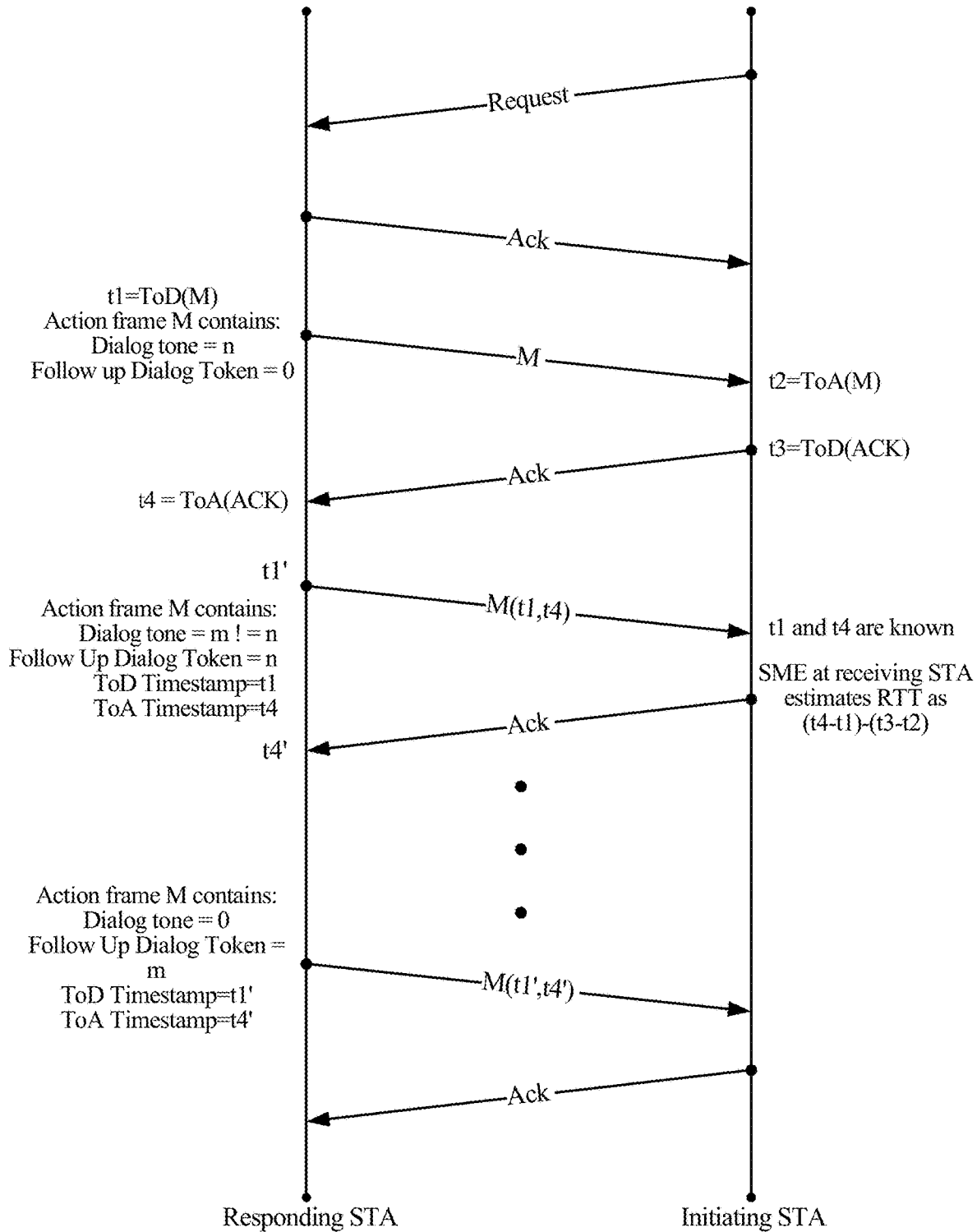
FIGS. 2 and 3 are diagrams illustrating message flows between wireless stations (STAs) according to particular embodiments.

FIG. 2 is a diagram illustrating a message flow between wireless stations STAs including a "responding" STA and an "initiating" STA according to an embodiment. In this context, a responding STA or initiating STA may comprise any one of several transceiver devices including a mobile device (e.g., mobile device 100) or stationary access transceiver device (e.g., local transceiver 115). It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a fine timing measurement request message or frame ("Request") to the responding STA and receive a fine timing request message acknowledgment message or frame ("Ack") transmitted in response. In a particular implementation, while not limiting claimed subject matter in this respect, contents of such a fine timing measurement request message may be as shown in the IEEE std. 802.11 at section 8.6.8.25. In particular implementations, such an Ack frame may merely provide an indication of receipt of a previously transmitted message. The initiating STA may then obtain or compute an RTT measurement based, at least in part, on time stamp values (t1, t4) provided in fine timing measurement messages or frames ("M") received from the responding STA (and transmitted in response to receipt of a fine timing measurement request message). In a particular implementation, as shown in the message flow diagram, a sequence of multiple exchanges of alternating fine timing measurement messages followed by fine timing measurement acknowledgment messages may create additional time stamp values (t1, t2, t3 and t4).

According to an embodiment, a fine timing measurement (FTM) request message transmitted by an initiating STA may include fields, parameters, etc. characterizing a desired exchange of messages with a responding STA to provide fine timing measurements to the initiating STA enabling the initiating STA to compute an RTT measurement. In response to receipt of an FTM request message, a responding STA may transmit to the initiating STA one or more FTM messages including measurements or parameters enabling the initiating STA to compute RTT or other parameters indicative of range.

In a particular implementation, while not limiting claimed subject matter in this respect, contents of such a fine timing measurement message or frame may be as shown in the IEEE std. 802.11 at section 8.6.8.26. In one example implementation, an initiating STA may compute an RTT measurement as $(t4-t1)-(t3-t2)$, where t2 and t3 are the time of receipt of a previous fine timing measurement message or frame and transmission of a preceding acknowledgment message or frame, respectively. The initiating STA may transmit a single FTM request message to obtain a corresponding number of RTT measurements which may be combined for cancellation of unbiased measurement noise in computing a range between the receiving and responding STAs.

FTM request messages and FTM messages may transmitted by STAs in addition to frames or messages for other services (e.g., for Internet Protocol messaging). In dense wireless traffic scenarios such as airport terminals or stadium events, transmission of FTM request messages and FTM messages for the computation of RTT may stress available messaging capacity at a STA. Particular implementations discussed herein may be directed to an exchange of messages for obtaining measurements for computation of range between STAs using the transmission of fewer messages by a STA.

As discussed below, an initiating STA and a responding STA may be synchronized to enable the initiating STA to accurately measure of a time of flight (TOF) of an FTM measurement message transmitted from the responding STT to the initiating STA. In a particular implementation, the initiating STA and responding STA may maintain clock signals that are synchronized to one another. For example, the initiating and/or responding STA may be capable of converting between time as maintained at the initiating STA and time as maintained at the responding STA. Clocks maintained at the initiating and responding STAs may be synchronized using any of one of several techniques such as those provided or suggested by IEEE std. 802.11REVmc Draft 3.0, section 10.24.5 or IEEE std. 802.11REVmc Draft 3.0, section 10.24.6. It should be understood, however, that this is merely an example of techniques that may be applied in synchronizing an initiating STA with a responding STA, and claimed subject matter is not limited in this respect.

According to an embodiment, a TOF of a message wirelessly transmitted from a transmitting device and acquired at a receiving device may be measured if the transmitted message includes a time stamp value indicating a transmission time. In a particular implementation, the transmitted message may comprise fields (e.g., preamble, header and payload) containing encoded symbols that are detectable at the receiving device. To acquire the transmitted message and determine a time of arrival, the receiving device may detect or decode a particular symbol or symbols in a sequence of symbols being transmitted by the message. If the particular symbol is referenced to the time stamp value also included in the transmitted message, the receiving device may measure TOF based on a difference between the time stamp value and an instance that the particular symbol is decoded or detected.

Figure 3:
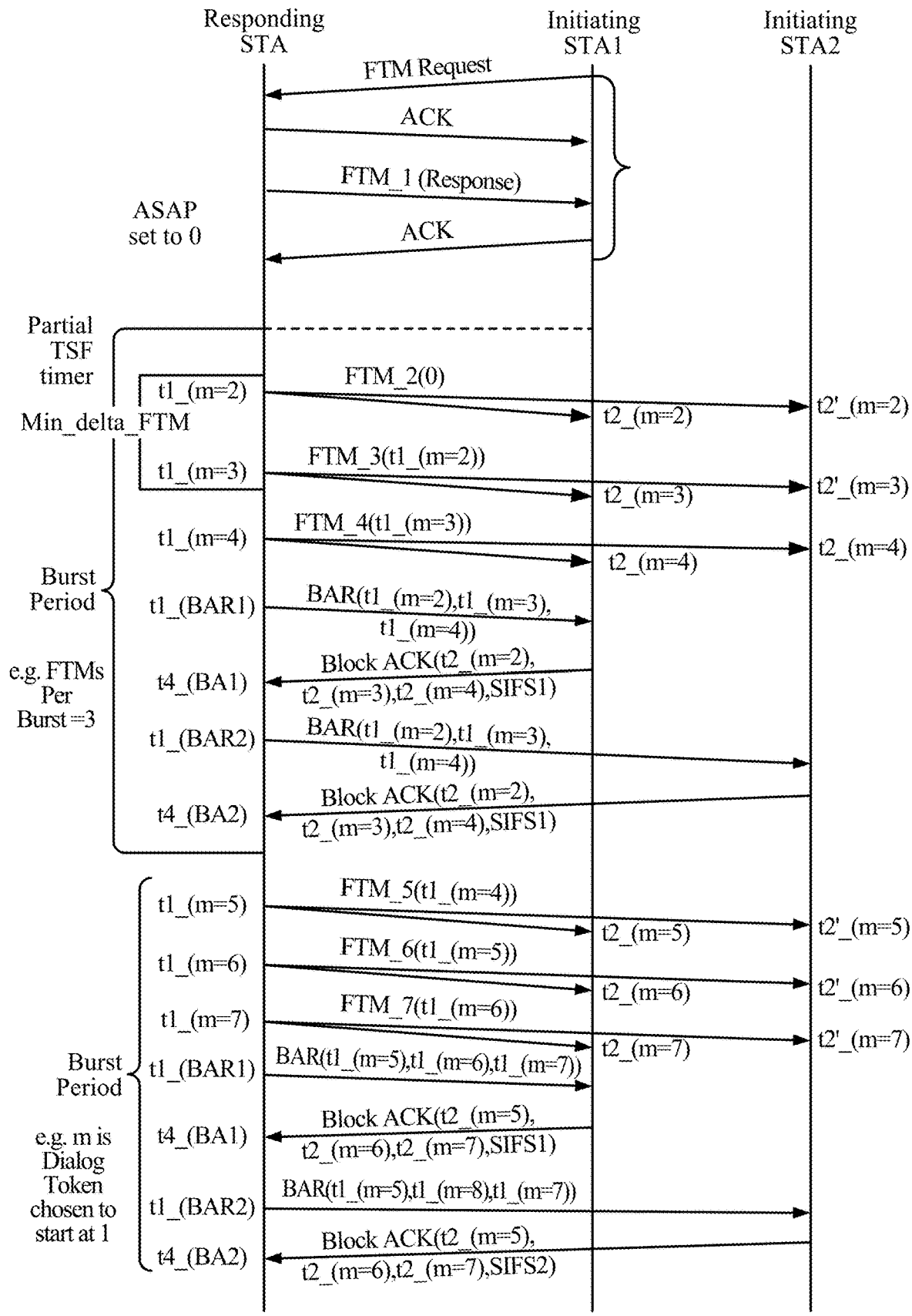
Figure 4:
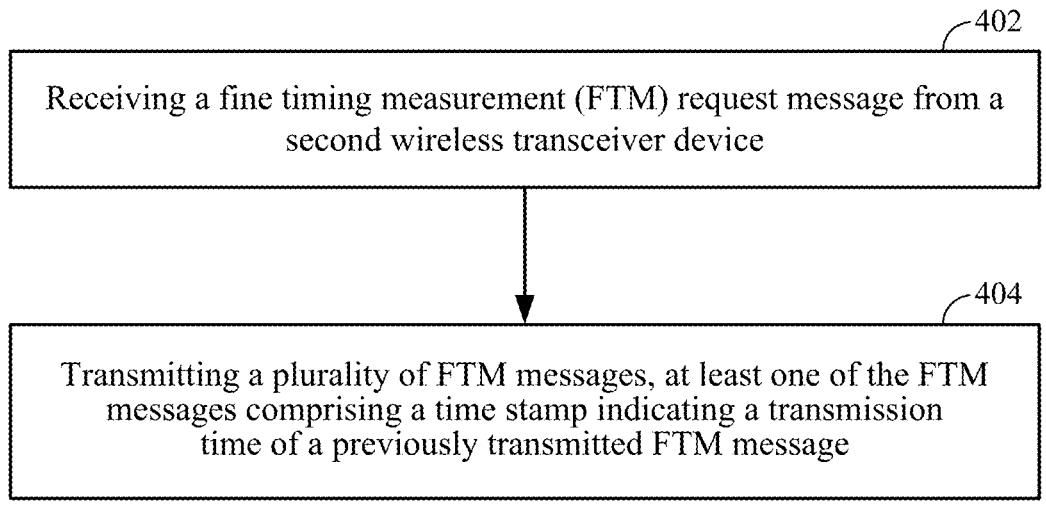
FIGS. 4 and 5 are flow diagrams illustrating processes to exchange messages between devices according to particular embodiments.
Figure 5:
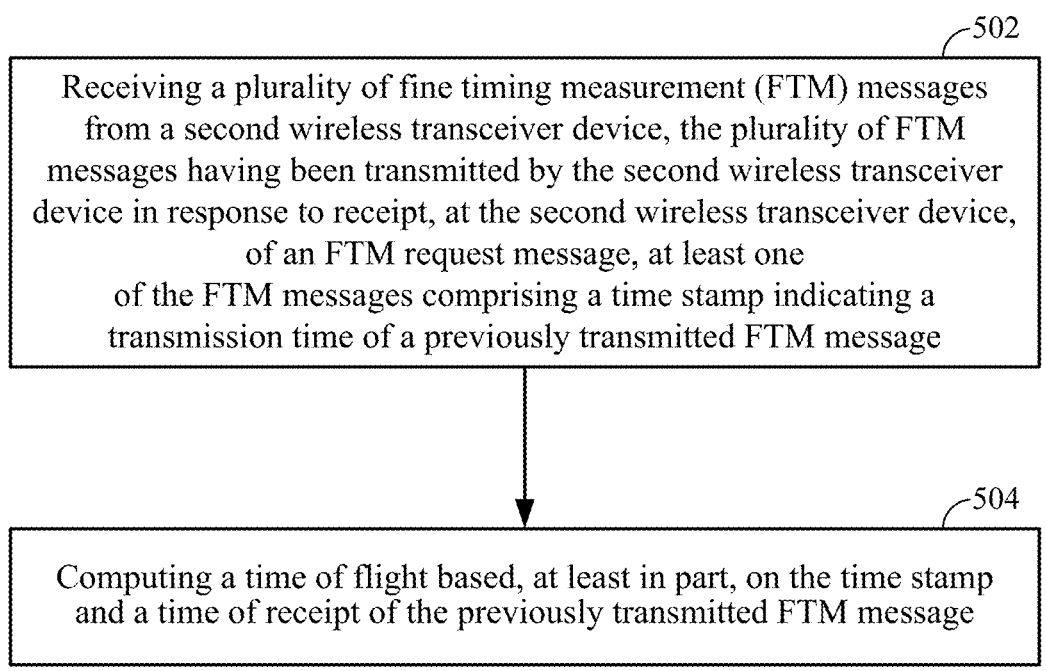

FIG. 3 is a message flow diagram illustrating a technique for measuring a TOF of FTM messages transmitted from a responding STA to one or more initiating STAs. FIGS. 4 and 5 are flow diagrams of processes in connection with an exchange of messages between wireless transceiver devices as illustrated by particular example in the message flow diagram of FIG. 3. In a particular example, actions shown in FIG. 4 may be performed by a responding STA and actions shown in FIG. 5 may be performed by an initiating STA. As discussed below, processes shown in FIGS. 4 and 5 may enable computation of a TOF.

As shown, a responding STA may respond to receipt of an FTM measurement request message by transmitting a plurality of FTM measurements in one or more bursts of FTM messages. As shown in FIG. 3, initiating STA1 may transmit a FTM request message to responding STA which may receive the FTM request message at block 402. The responding STA may transmit an initial FTM message in response. Initiating STA1 and responding STA may then synchronize according to IEEE std. 802.11REVmc Draft 3.0, section 10.24.5 or IEEE std. 802.11REVmc Draft 3.0, section 10.24.

Following synchronization, a responding STA may transmit one or more bursts of FTM messages at block 404. An FTM message in a burst of FTM messages may include time stamp value indicating a transmission time of a previously transmitted message in the burst. In this context, a "time stamp value" comprises an expression that is indicative of a time of occurrence of a particular event. In one example implementation, a time stamp value may comprise an expression of a time that a particular event occurs according to a reference time maintained at a particular device. As shown in FIG. 3, in a particular non-limiting example, a first burst of FTM messages is transmitted by the responding STA at times t1_(m=2), t1_(m=3) and t1_(m=4), and a second burst of FTM messages is transmitted by the responding STA at times t1_(m=5), t1_(m=6) and t1_(m=7).

As shown in the particular example of FIG. 5, at block 502 a wireless transceiver device (e.g., initiating STA1) may receive FTM messages from a second wireless transceiver device (e.g., responding STA). As shown in a particular non-limiting example of FIG. 3, FTM messages in a first burst are received by an initiating STA, STA1, at times t2_(m=2), t2_(m=3) and t2_(m=4), and FTM messages in the second burst are received by STA1 at times t2_(m=5), t2_(m=6) and t2_(m=7). As pointed out above, one or more FTM messages in the bursts of FTM messages may include a time stamp value indicating a transmission time of a previously received FTM message. As discussed below, at block 504 an initiating STA may compute TOF of the received messages based, at least in part, on the time stamp value and a time of receipt of the previously received FTM message.

In a particular example implementation, an FTM message in a burst of FTM messages may include one or more data fields specifying a time of transmission of an immediately preceding FTM message in the burst. Recovering transmission times from received FTM messages, initiating STA1 may compute a TOF measurement for a burst of FTM messages according to expression (1) as follows:

$$TOF = \frac{1}{h} \sum_{j=1}^{h} t2\_(m = j + 1) - t1\_(m = j + 1), \quad (1)$$

where h is a number of frames in a burst of FTM messages.

In alternative embodiments, a TOF may be computed based on times t1 and t2 of a single FTM message.

Figure 6:
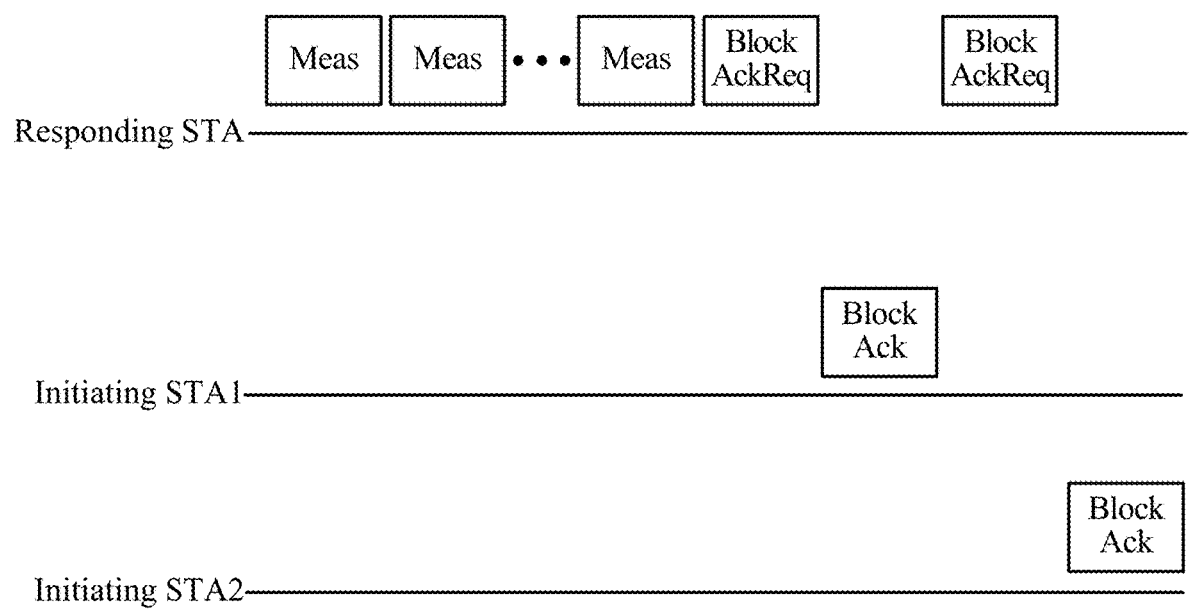
FIG. 6 is a diagram showing a sequence of messages according to an embodiment.
Figure 7:
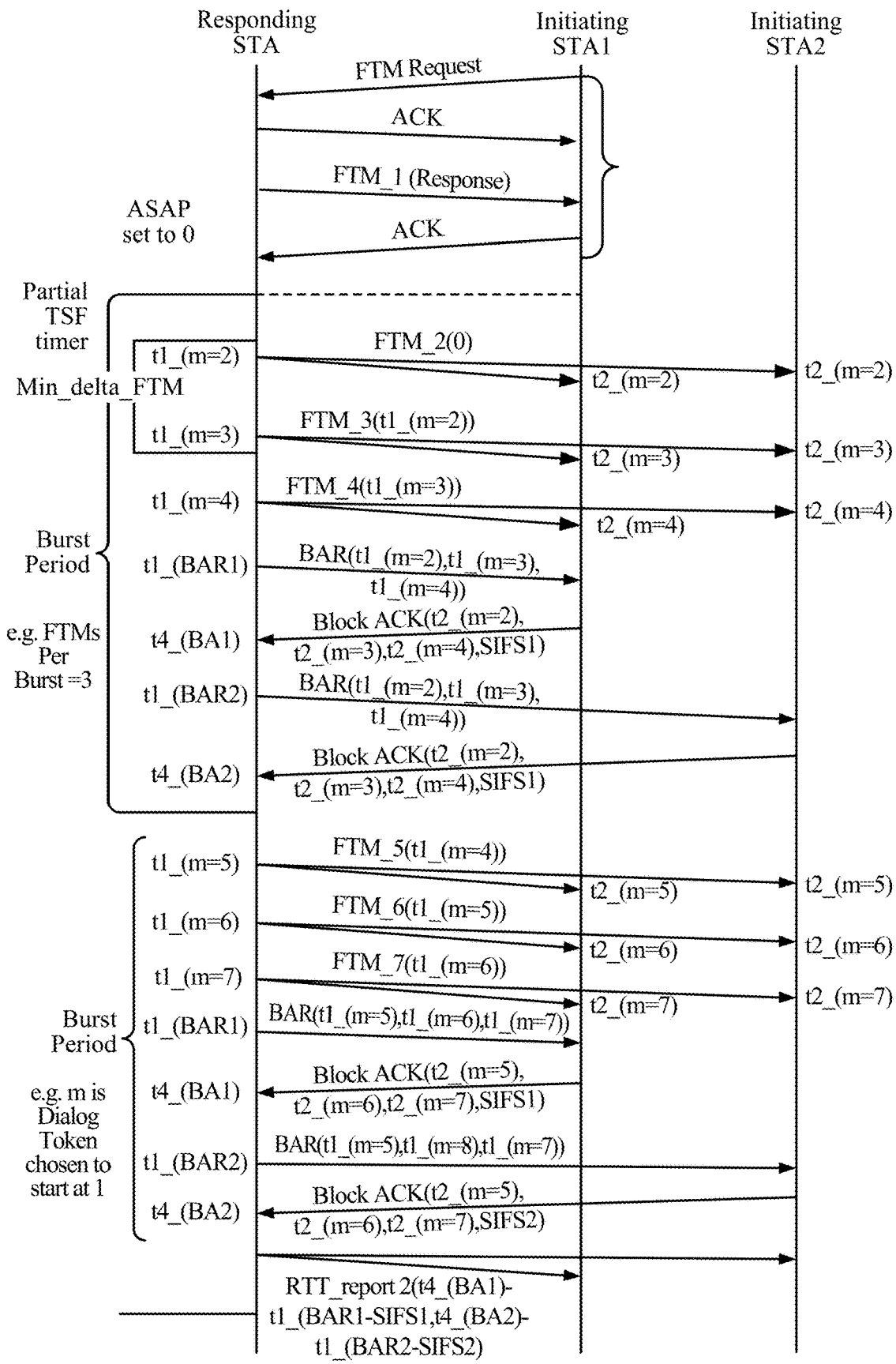
FIG. 7 is a diagram illustrating a message flow between wireless STAs according to a particular embodiment.

FIG. 6 shows the timing of messages transmitted from a responding STA, and initiating STAs STA1 and STA2. Messages labeled as "Meas" may comprise FTM messages transmitted in response to FTM request messages, for example. Alternatively, "Meas" may comprise different types of messages such as, for example, VoIP packets or video packets, just to provide a couple of example alternatives. As such, techniques described herein are not limited to the use of FTM request messages. Following transmission of a burst of messages (e.g., FTM messages), a responding STA may transmit block acknowledgment request (BAR) message requesting an acknowledgment of a receipt of the burst of messages. As shown in FIG. 3, a BAR message may comprise fields specifying the transmission times of the messages in an associated burst of messages. Alternatively, a BAR message may specify differences in times of transmission of messages in an associated burst of messages (e.g., t1_(m=1), t1_(m=2)–t1(m=1), t1_(m=3)–t1(m=2)). In response to receipt of a BAR message from a responding STA, an initiating STA may transmit a block acknowledgment (BA) message which acknowledge receipt of the messages in a previous burst of messages, and may also include parameters based on times of receipt of the messages in the burst. Implementation of BAR and BA messages may enable a further reduction in message traffic for measuring TOF.

In one example, a BA message may include times of receipt of messages at the initiating STA. In another example, a BA message may include a differential for messages in the burst (e.g., t2_(m=1), t2_(m=2)–t2_(m=1), t2_(m=3)–t2_(m=2)). In another example, a BA message may include a computed TOF for messages in the burst as computed according to expression (1) above. In another example, a BA message may include TOF values computed for individual messages in the burst (e.g., t2_(m=k)–t1_(m=k)). Furthermore, a BA message may also specify a Short Interframe Space (SIFS) value, or a SIFSTime, quantifying a time interval between receipt of a BAR message from a responding STA and transmission of a BA message in response to receipt of the BAR message. In one implementation, contents of a BA message provided to a responding STA (e.g., including SIFS) may enable the responding STA to $$TOF(K) = \frac{\left\{\frac{1}{h+1}\left[\sum_{j=1}^{h} t2_{m=j+1} - t1_{m=j+1}\right] + \frac{t4_{BAK} - t1_{BARK} - SIFSK - TXTIME_{BARK}}{2}\right\}}{2} \quad (2)$$

In addition, inclusion of SIFS in a BA message may further enable a responding STA to compute RTT as follows, where synchronization is no longer needed:

RTT=t4_(BAK)-t1_(BARK1)-SIFSK1-TXTIME (BARK), (3)

Where:

t4_(BAK) is a time that a BA message transmitted by an initiating STA K is received at the responding STA;

t1_(BARK) is a time of a transmission of a BAR message from the responding STA to initiating STA K;

SIFS1 is a value of SIFS provided in a BA message from an initiating STA; and

TXTIME(BARK) is the transmit time of the message BAR K.

Here, a responding STA may be capable of computing a range to an initiating STA even if the responding STA and initiating STA are not synchronized (e.g., initiating STA and responding STA are maintaining clocks that are not synchronized). Additionally, a responding STA computing RTT according to expression (3) may transmit a report back to the initiating STA to enable the initiating STA to check measurements of TOF (e.g., computed according to expression (1) above) against RTT measurements in an RTT report. In one particular implementation, an initiating STA may combine RTT with TOF to provide a more accurate representation of a range between the responding and initiating STAs.

As shown in FIG. 3, FTM messages transmitted by a responding STA may be received by an initiating STA other than initiating STA1. For example, initiating STA2 may receive and respond to FTM messages transmitted from a responding STA even if the FTM messages are transmitted in response to FTM request messages transmitted from an initiating STA other than initiating STA2. Here, initiating STA2 may similarly compute a TOF based on parameters provided in the received FTM messages, for example. Likewise, STA2 may receive BAR messages from the responding STA and transmit BA messages in response. According to an embodiment, initiating STAs STA 1 and STA2 may have been previously synchronized (e.g., maintaining synchronized clocks) using techniques according to the aforementioned IEEE std. 802.11REVmc Draft 3.0, section 10.24.5 or IEEE std. 802.11REVmc Draft 3.0, section 10.24.6.

Figure 8:
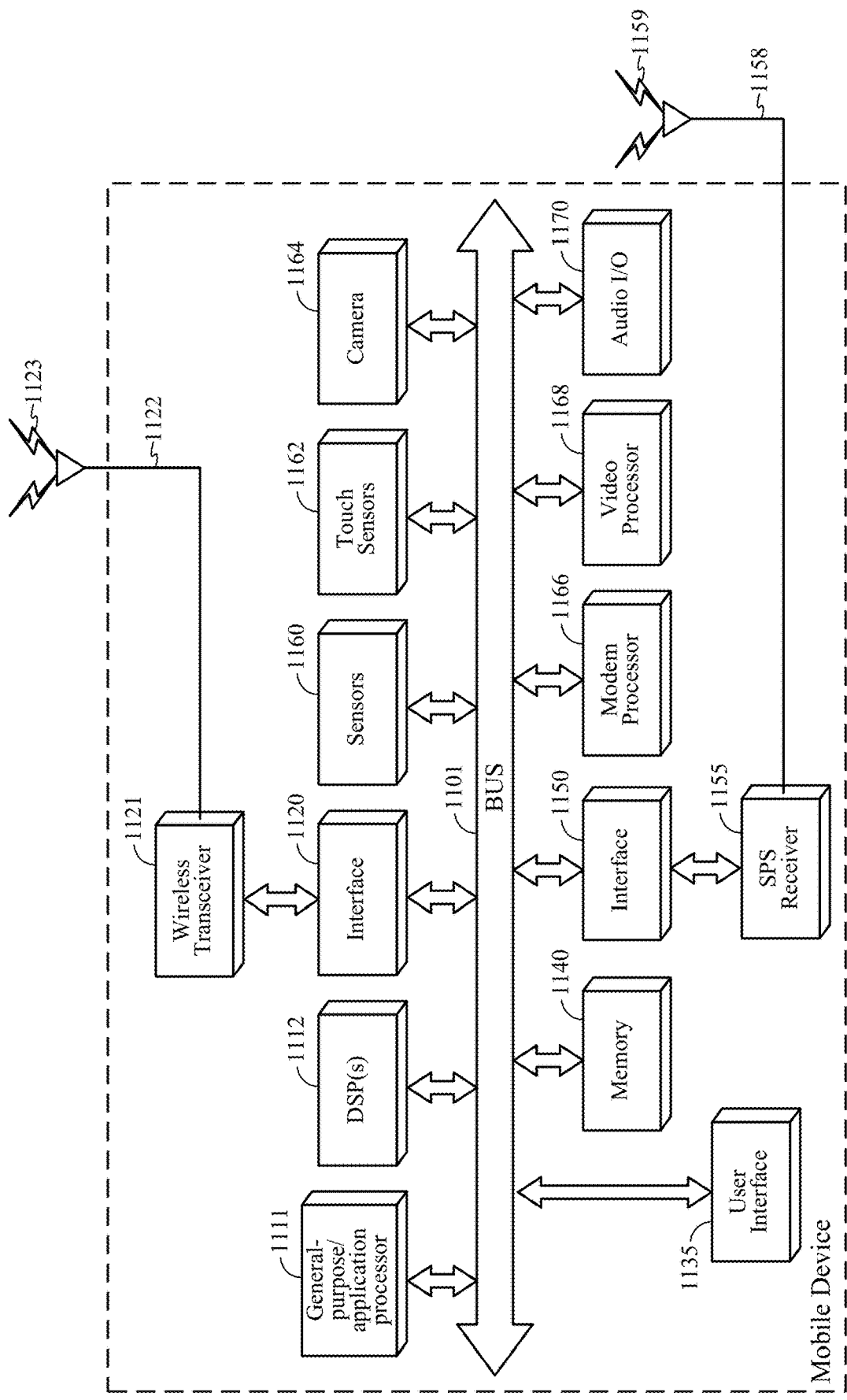
FIG. 8 is a schematic block diagram illustrating an exemplary device, in accordance with an implementation.

FIG. 8 is a schematic diagram of a mobile device according to an embodiment. Mobile device 100 (FIG. 1) may comprise one or more features of mobile device 1100 shown in FIG. 8. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 8, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions (e.g., instructions stored on memory 1140) to execute one or more aspects of processes discussed above in connection with FIGS. 4 and 5 (e.g., in coordination with wireless transceiver device and wireless antenna 1122). In addition, Mobile device 1100 may comprise a time reference unit (not shown) for use in maintaining a periodic clock signal to, among other things, determine time stamp values representing a time that a message is transmitted or received.

In one particular implementation, transmission of an ACK message in response to a FTM measurement request message may be performed by wireless transceiver device 1121 without instruction or initiation from general-purpose processor(s) 1111 or DSP(s) 1112. On the other hand, an FTM range report message may be formed at a programmable device such as general-purpose processor(s) 1111 and/or DSP(s) 1112 (e.g., from execution of one or more machine-readable instructions stored in memory 1140).

Also shown in FIG. 8, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 9:
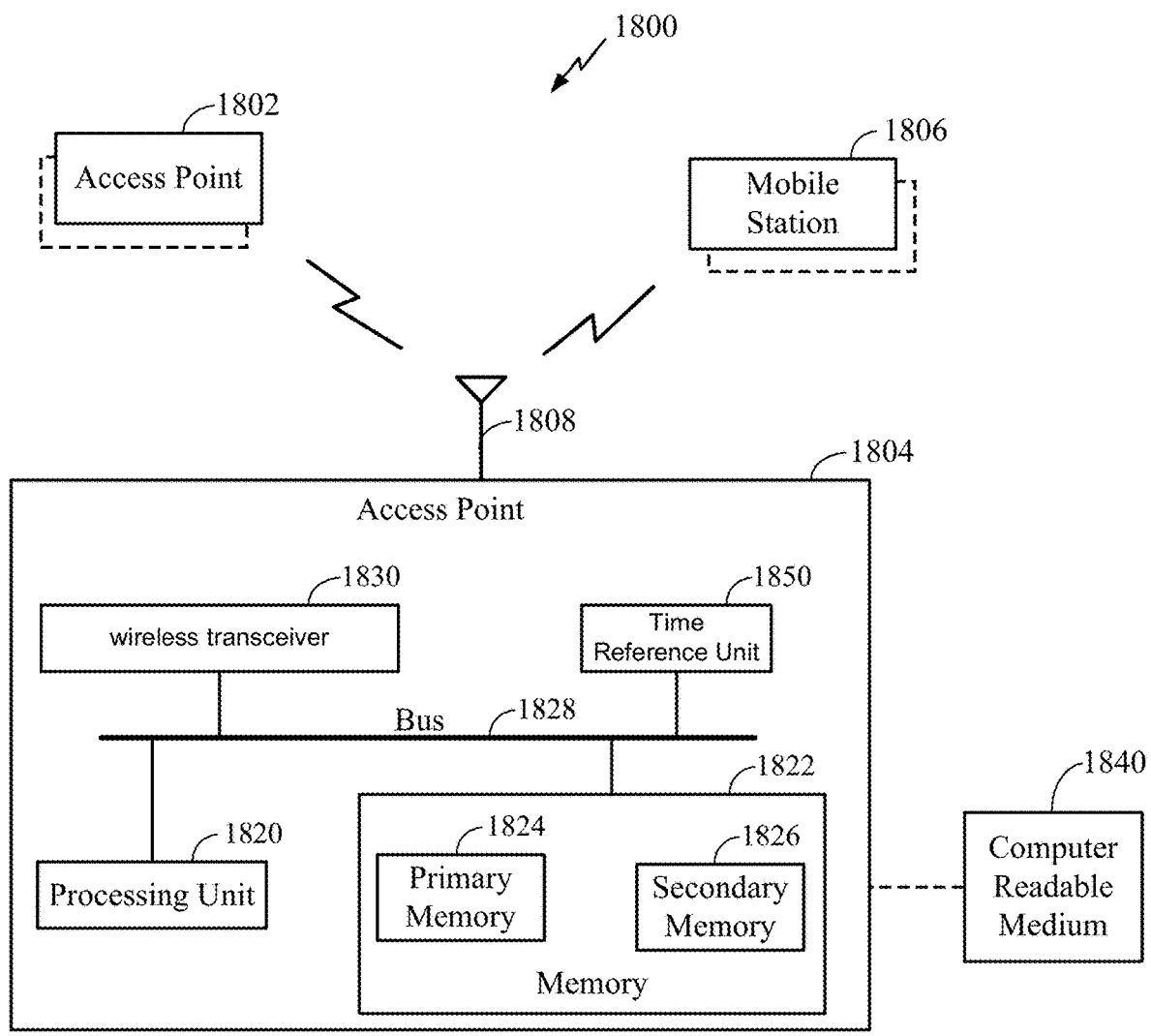
FIG. 9 is a schematic block diagram of an example computing system in accordance with an implementation.

FIG. 9 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115 or base station transceiver 110) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 9, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 9, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 9, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828. In addition, second device 1804 may further comprise a time reference unit 1850 for use in maintaining a periodic clock signal to, among other things, determine time stamp values representing a time that a message is transmitted or received.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820. In a particular implementation, memory 1822 and processing unit 1820 may be configured to execute one or more aspects of process discussed above in connection with FIGS. 4 and 5 (e.g., in coordination with wireless transceiver 1830 and antenna 1808).

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a wireless transceiver 1830 that provides for or otherwise supports the operative coupling of second device 1804 to a wireless communications network at least through an antenna 1808. By way of example but not limitation, wireless transceiver 1830 may include circuitry implementing a transmitter device for transmitting messages to other devices in system 1800 (e.g., first device 1802 and second device 1806) and circuitry (e.g., a wireless modem device) implementing a receiver to receive messages transmitted from the other devices in system 1800. In a particular implementation, antenna 1808 in combination with wireless transceiver 1830 may be used to implement transmission and reception of messages at process described above with reference to FIGS. 4 and 5.

In one particular implementation, transmission of an ACK message in response to a FTM measurement request message may be performed at wireless transceiver 1830 without instruction or initiation from processing unit 1830. On the other hand, an FTM range report message may be formed at a programmable device such as processing unit 1820 (e.g., from execution of one or more machine-readable instructions stored in memory 1820).

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, trackball, touch screen, data port, etc.

Briefly, particular implementations are directed to a method comprising, at a first wireless transceiver device, a method comprising: receiving a plurality of fine timing measurement (FTM) messages from a second wireless transceiver device, the plurality of FTM messages having been transmitted by the second wireless transceiver device in response to receipt, at the second wireless transceiver device, of an FTM request message, at least one of the plurality of FTM messages comprising a time stamp indicating a transmission time of a previously transmitted FTM message; and computing a time of flight based, at least in part, on the time stamp and a time of receipt of said previously transmitted FTM message.

Another particular implementation is directed to a method, at a first wireless transceiver device, comprising: receiving a fine timing measurement (FTM) request message from a second wireless transceiver device; and transmitting a plurality of FTM messages, at least one of the plurality of FTM messages comprising a time stamp indicating a transmission time of a previously transmitted FTM message.

Another particular implementation is directed to a first wireless transceiver device, comprising: a transceiver to transmit message to and receive messages from a wireless communication network; and one or more processors to configured to: obtain a plurality of fine timing measurement (FTM) messages at the transceiver from a second wireless transceiver device, the plurality of FTM messages being transmitted by the second wireless transceiver device in response to receipt, at the second wireless transceiver device, of an FTM request message, at least one of the plurality of FTM messages comprising a time stamp indicating a transmission time of a previously transmitted FTM message; and compute a time of flight based, at least in part, on the time stamp and a time of receipt of the previously transmitted FTM message.

Another particular implementation is directed to a first wireless transceiver device comprising: a transceiver; and one or more processors configured to: obtain a fine timing measurement (FTM) request message received at the transceiver and transmitted from a second wireless transceiver device; and initiate transmission of a plurality of FTM messages through the transceiver, at least one of the plurality of FTM messages comprising a time stamp indicating a transmission time of a previously received FTM message, in response to the FTM request message.

Another particular implementation is directed to a first wireless transceiver device comprising: means for receiving a plurality of fine timing measurement (FTM) messages from a second wireless transceiver device, the plurality of FTM messages having been transmitted by the second wireless transceiver device in response to receipt, at the second wireless transceiver device, of an FTM request message, at least one of the plurality of FTM messages comprising a time stamp indicating a transmission time of a previously transmitted FTM message; and means for computing a time of flight based, at least in part, on the time stamp and a time of receipt of the previously transmitted FTM message. In one embodiment, the means for computing the time of flight further comprises: means for synchronizing the time stamp to the time of receipt based, at least in part, on a first clock signal maintained at the first wireless transceiver device synchronized to a second clock signal maintained at the second wireless transceiver device; and means for subtracting the synchronized time stamp from the time of receipt. In another embodiment, the means for synchronizing the time stamp to the time of receipt further comprises means for synchronizing the time stamp based, at least in part, on an exchange of the FTM request message and an initial FTM message transmitted in response to the FTM request message. In another embodiment, the first wireless transceiver device further comprises means for transmitting the FTM request message from the first wireless transceiver device. In yet another embodiment, the FTM request message is transmitted by a wireless transceiver device other than the first wireless transceiver device. In yet another embodiment, the first wireless transceiver device further comprises means for receiving a block acknowledgment request message from the second wireless transceiver device; and means for transmitting a block acknowledgment message to the second wireless transceiver device containing one or more parameters determined based, at least in part, on the time of receipt of the previously transmitted FTM message. In another embodiment, the block acknowledgment message further comprises the computed time of flight. In another embodiment, the first wireless transceiver device further comprises means for synchronizing the time stamp to the time of receipt of the previously transmitted FTM message based, at least in part, on a first clock signal maintained at the first wireless transceiver device synchronized to a second clock signal maintained at the second wireless transceiver device, and wherein the block acknowledgment message further comprises the time stamp. In another embodiment, the first wireless transceiver device further comprises means for receiving a block acknowledgment request message from the second wireless transceiver device; and means for transmitting a block acknowledgment message in response to receipt of the block acknowledgment request message, the block acknowledgment message comprising parameters indicative of the time of flight. In another embodiment, the block acknowledgment message further comprises an estimated short interframe space (SIFS), and the first wireless transceiver device further comprises means for receiving a report message from the second wireless transceiver device comprising a round trip time computed based, at least in part, on the estimated SIFS.

Another particular implementation is directed to a first wireless transceiver device comprising: means for receiving a fine timing measurement (FTM) request message from a second wireless transceiver device; and means for transmitting a plurality of FTM messages, at least one of the plurality of FTM messages comprising a time stamp indicating a transmission time of a previously transmitted FTM message. In one embodiment, the first wireless transceiver device further comprises means for transmitting a block acknowledgment request message, the block acknowledgment request message comprising transmission times of the plurality of FTM messages. In another embodiment, the first wireless transceiver device further comprises means for transmitting a block acknowledgment request message, the block acknowledgment request message comprising differences in transmission times of consecutive of FTM messages transmitted from the first wireless transceiver device. In another embodiment, the first wireless transceiver device further comprises: means for transmitting a block acknowledgment request message; and means for receiving a block acknowledgment message transmitted in response to receipt of the block acknowledgment request message. In another embodiment, the block acknowledgment message is transmitted by the second wireless transceiver device. In another embodiment, the block acknowledgment message is transmitted by a third wireless transceiver device other than the second wireless transceiver device. In another embodiment, the block acknowledgment message comprises one or more parameters determined based, at least in part, on times of receipt of the plurality of FTM messages. In another embodiment, the first wireless transceiver device further comprises means for transmitting a block acknowledgment request message to the second wireless transceiver device containing one or more parameters determined based, at least in part, on a time of receipt of the FTM request message; and means for receiving a block acknowledgment message from the second wireless transceiver device.

Another particular implementation is directed to a storage medium comprising computer readable instructions stored thereon which are executable by a processor of a first wireless transceiver device to: obtain a plurality of fine timing measurement (FTM) messages received from a second wireless transceiver device, the plurality of FTM messages having been transmitted by the second wireless transceiver device in response to receipt, at the second wireless transceiver device, of an FTM request message, at least one of the plurality of FTM messages comprising a time stamp indicating a transmission time of a previously transmitted FTM message; and compute a time of flight based, at least in part, on the time stamp and a time of receipt of the previously transmitted FTM message. In an embodiment, the computer readable instructions are further executable by the processor to synchronize the time stamp to the time of receipt based, at least in part, on a first clock signal maintained at the first wireless transceiver device synchronized to a second clock signal maintained at the second wireless transceiver device; and subtract the synchronized time stamp from the time of receipt. In another embodiment, the computer readable instructions are further executable by the processor to synchronize the time stamp based, at least in part, on an exchange of the FTM request message and an initial FTM message transmitted in response to the FTM request message. In another embodiment, the computer readable instructions are further executable by the processor to initiate transmission of the FTM request message from the first wireless transceiver device. In another embodiment the FTM request message is transmitted by a wireless transceiver device other than the first wireless transceiver device. In another embodiment, the computer readable instructions are further executable by the processor to obtain a block acknowledgment request message received from the second wireless transceiver device; and initiate transmission of a block acknowledgment message to the second wireless transceiver device containing one or more parameters determined based, at least in part, on the time of receipt of the previously transmitted FTM message. In another embodiment, the block acknowledgment message further comprises the computed time of flight. In another embodiment, the computer readable instructions are further executable by the processor to synchronize the time stamp to the time of receipt of the previously transmitted FTM message based, at least in part, on a first clock signal maintained at the first wireless transceiver device synchronized to a second clock signal maintained at the second wireless transceiver device, and wherein the block acknowledgment message further comprises the time stamp. In another embodiment, the computer readable instructions are further executable by the processor to obtain a block acknowledgment request message received from the second wireless transceiver device; and initiate transmission of a block acknowledgment message in response to receipt of the block acknowledgment request message, the block acknowledgment message comprising parameters indicative of the time of flight. In another embodiment, the block acknowledgment message further comprises an estimated short interframe space (SIFS), the method further comprising receiving a report message from the second wireless transceiver device comprising a round trip time computed based, at least in part, on the estimated SIFS.

Another particular implementation is directed to a storage medium comprising computer readable instructions stored thereon which are executable by a processor of a first wireless transceiver to: obtain a fine timing measurement (FTM) request message received from a second wireless transceiver device; and initiate transmission of a plurality of FTM messages, at least one of the plurality of FTM messages comprising a time stamp indicating a transmission time of a previously transmitted FTM message. In one embodiment, the computer readable instructions are further executable by the processor to initiate transmission of a block acknowledgment request message, the block acknowledgment request message comprising transmission times of the plurality of FTM messages. In another embodiment, the computer readable instructions are further executable by the processor to initiate transmission of a block acknowledgment request message, the block acknowledgment request message comprising differences in transmission times of consecutive of FTM messages transmitted from the first wireless transceiver device. In another embodiment, the computer readable instructions are further executable by the processor to initiate transmission of a block acknowledgment request message; and obtain a block acknowledgment message transmitted in response to receipt of the block acknowledgment request message. In another embodiment, the block acknowledgment message is transmitted by the second wireless transceiver device. In another embodiment, the block acknowledgment message is transmitted by a third wireless transceiver device other than the second wireless transceiver device. In another embodiment, the block acknowledgment message comprises one or more parameters determined based, at least in part, on times of receipt of the plurality of FTM messages. In another embodiment, the computer readable instructions are further executable by the processor to initiate transmission of a block acknowledgment request message to the second wireless transceiver device containing one or more parameters determined based, at least in part, on a time of receipt of the FTM request message; and obtain a block acknowledgment message received from the second wireless transceiver device.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. At a first wireless transceiver device, a method comprising:
   receiving a plurality of fine timing measurement (FTM) messages from a second wireless transceiver device, the plurality of FTM messages having been transmitted in response to receipt of an FTM request message at the second wireless transceiver device, the FTM request message having been transmitted from a third wireless transceiver device;
   receiving a block acknowledgement request message from the second mobile device comprising one or more parameters based at least in part, on times of transmission of the plurality of FTM messages; and
   transmitting a block acknowledgement message in response to receipt of the block acknowledgement request message, wherein the block acknowledgement message includes at least one time of flight value that is based at least in part on the times of transmission of the plurality of FTM messages.

2. The method of claim 1, wherein the block acknowledgment message further comprises an estimated short interframe space (SIFS), the method further comprising receiving a report message from the second wireless transceiver device comprising a round trip time computed based, at least in part, on the estimated SIFS.

3. At a first wireless transceiver device, a method comprising:
   receiving a fine timing measurement (FTM) request message transmitted from a second wireless transceiver device;
   transmitting a plurality of FTM messages in response to receipt of the FTM request message transmitted from the second wireless transceiver device;
   transmitting a block acknowledgment request message, the block acknowledgment request message comprising one or more parameters based, at least in part, on transmission times of the plurality of FTM messages; and
   receiving a block acknowledgement message transmitted by a third wireless transceiver device in response to receipt of the block acknowledgment request message at the third wireless transceiver device, wherein the block acknowledgement message includes at least one time of flight value that is based at least in part on the transmission times of the plurality of FTM messages.

4. The method of claim 3, wherein the block acknowledgment request message comprises one or more parameters based, at least in part, on differences in transmission times of consecutive of FTM messages transmitted from the first wireless transceiver device.

5. A first wireless transceiver device, comprising:
   a transceiver to transmit messages to and receive messages from a wireless communication network; and
   one or more processors configured to:
   obtain a plurality of fine timing measurement (FTM) messages received at the transceiver from a second wireless transceiver device, the plurality of FTM messages having been transmitted in response to receipt of an FTM request message at the second wireless transceiver device the FTM request message having been transmitted from a third wireless transceiver device;
   obtain a block acknowledgment request message received at the transceiver and transmitted from the second wireless transceiver device, the block acknowledgement request message comprising one or more parameters based, at least in part, on times of transmission of the plurality of FTM messages; and
   initiate transmission of a block acknowledgement message through the transceiver in response to receipt of the block acknowledgement request message, wherein the block acknowledgment message includes at least one time of flight value that is based at least in part on the times of transmission of the plurality of FTM messages.

6. A first wireless transceiver device comprising:
   a transceiver; and
   one or more processors configured to:
   obtain a fine timing measurement (FTM) request message received at the transceiver and transmitted from a second wireless transceiver device;
   initiate transmission of a plurality of FTM messages through the transceiver in response to receipt of the FTM request message transmitted from the second wireless transceiver device;
   initiate transmission of a block acknowledgement request message through the transceiver comprising one or more parameters based, at least in part, on transmission times of the plurality of FTM messages;

obtain a block acknowledgement message received at the transceiver and transmitted by a third wireless transceiver device in response to receipt of the block acknowledgement request message at the third wireless transceiver device, wherein the block acknowledgement message includes at least one time of flight value that is based at least in part on the transmission times of the plurality of FTM messages.

7. The first wireless transceiver device of claim 6, wherein the one or more processors configured to obtain a second block acknowledgment message obtained at the transceiver and transmitted by the second wireless transceiver device.

\* \* \* \* \*